United States Patent Office 2,805,996
Patented Sept. 10, 1957

2,805,996

PROCESS FOR THE PRODUCTION OF OIL SOLUBLE AMINE COMPLEXES AND COMPOSITIONS CONTAINING SUCH COMPLEXES

Thomas E. Deger, Ambler, Pa., assignor, by mesne assignments, to Pennsalt Chemicals Corporation, a corporation of Pennsylvania No Drawing. Application September 29, 1954,
Serial No. 457,283

18 Claims. (Cl. 252—33.6)

This invention relates to derivatives of dithiocarbamic acid. It is particularly concerned with amine complexes of metal salts of substituted dithiocarbamic acids, and with a new and novel process of preparing such complex compounds in forms which are especially suitable for industrial use. This invention also pertains to new compositions of matter containing such complex compounds.

It has been discovered that, generally speaking, the amine-dithiocarbamate complexes of this invention possess a surprisingly high degree of solubility in oils of mineral, vegetable, animal, and synthetic origin. It has likewise been discovered that, by the choice of the proper reactants, it is technically feasible and economically advantageous to prepare said complexes in the presence of one or more oils of the kind indicated. In such a case, the oil performs a dual function, in that it serves as an excellent inert reaction medium, and also as an excellent solvent for the complex compound formed by reaction.

The proportion of oil to reactants may be varied between quite wide limits, and after the reaction has been carried out and the water of reaction has been removed, the final products are clear, liquid solutions of the resulting complexes in oil. In many instances, the complex may constitute as high as say 95% by weight of the final liquid solution.

Concentrates, such as solutions containing say between about 20% and 95% of the amine-dithiocarbamate complex, may readily be prepared by the practice of this invention, and no special problems are presented by such preparation, nor by subsequent packaging, storage, shipping, and other handling of the products.

It is known that the amine-dithiocarbamate complexes are powerful vulcanization accelerators, and the concentrates of this invention may be employed to excellent advantage for such purposes. It has now been discovered that the complexes are excellent lubricating oil additives, and that the presence of quite small amounts of such complex compounds in lubricating oils confers valuable properties, such as antioxidant and corrosion inhibiting properties, which the oils themselves do not possess to an adequate extent. Therefore, in the compounding of a finished lubricating oil, it is merely necessary to mix a concentrate of this invention with such amount of oil as may be needed, in order to furnish any desired useful concentration of complex in the finished oil.

Accordingly, it is an object of the invention to provide concentrated solutions of one or more amine-dithiocarbamate complex compounds in one or more mineral, vegetable, animal, or synthetic oils, the concentration of the complex material being between about 10% and 95% based on the weight of solution. It is also an object to provide an economical process by which such concentrates may be manufactured from simple, readily available raw materials, such manufacture being carried out in a one-step reaction if desired. It is another object to provide finished lubricants having improved properties by virtue of the presence therein of small amounts of amine-dithiocarbamate complex material. These and other objects will be obvious from this description.

The addition of metal salts of substituted dithiocarbamic acids to lubricants as a means of imparting desirable properties thereto has been proposed previously, but in general the low degree of oil solubility of such salts has militated against commercially successful products based on such proposals. This difficulty, which particularly manifests itself in the case of salts having relatively small hydrocarbon radicals attached to the dithiocarbamate nitrogen atom, becomes quite acute when the total number of carbon atoms in the radicals attached to such nitrogen atom is less than say twelve. In many instances, such salts are oil-soluble to such a slight extent that they are able to exhibit but a mere fraction of the antioxidant and/or other beneficial properties which they potentially possess, and which they would exhibit could they be dissolved in sufficient quantity in the oil.

The amine-dithiocarbamate complexes of this invention, on the other hand, are extremely oil-soluble, as has been pointed out. They may readily be dissolved in lubricating oils in any amounts which might be considered necessary for additive purposes, or in larger amount if desired for any reason. Thus the complexes eliminate the hitherto unsolved problem of oil-solubilizing difficultly soluble metal salts of substituted dithiocarbamic acids. Regardless of the degree of oil-solubility of the parent salt, however, the present invention affords a particularly economical and advantageous method of preparing for use and handling any such salt in the form of an amine complex.

Whether the improved properties of finished lubricants containing the amine-dithiocarbamate complexes are due to the complexes themselves, or to the metal substituted dithiocarbamate portion thereof, is not known. In either case, lubricants containing active ingredient in amounts sufficient for the intended purpose are made possible.

The amine-dithiocarbamate complex compounds which are contemplated by this invention may be represented by the following formula:

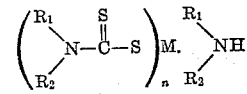

wherein $R_1$, taken individually, represents one of the group consisting of alkyl radicals of at least two carbon atoms, cycloalkyl radicals, and aralkyl radicals; wherein $R_2$ taken individually, represents one of the group consisting of alkyl radicals of at least two carbon atoms and aralkyl radicals; wherein $R_1$ and $R_2$, taken collectively, represent one of the group consisting of polymethylene and alkyl-substituted polymethylene radicals; wherein M is a metal selected from the group consisting of copper, silver, calcium, strontium, barium, zinc, cadmium, mercury, lead, chromium, molybdenum, iron, cobalt, nickel, selenium, and tellurium; wherein $n$ is an integer equal to the valence of M; wherein the carbon atom content of the molecule is at least 20; and wherein the N-attached carbon atoms of the substituents are attached to not more than one other carbon atom.

When $R_1$ and $R_2$ in the foregoing formula represent two radicals, said radicals may be the same or different; this applies both to the amine portion and to the metal dithiocarbamate portion of the complex compound. Although for reasons of convenience it is indicated in the formula that the amine portion of the complex molecule is similar to the metal dithiocarbamate portion, this is not necessary, and in fact it may sometimes be desirable that the two portions of the complex molecule be dissimilar, as for example in the following compound:

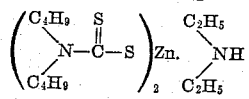

While the above-mentioned formulas contemplate complex compounds having a 1:1 molecular ratio of amine to metal salt of the substituted dithiocarbamic acid, it is to be understood that more amine may be added and will be retained in the oil, either in the form of a higher ratio complex of amine to dithiocarbamate, or as a coupling agent, or both.

Examples of alkyl radicals are ethyl, propyl, butyl, amyl, hexyl, heptyl, octyl, nonyl, decyl, undecyl, dodecyl, tridecyl, tetradecyl, pentadecyl, and hexadecyl radicals, including isomeric forms thereof, but excluding radicals attached to N by other than primary carbon atoms.

Examples of cycloalkyl radicals are cyclohexyl and cycloheptyl radicals.

Examples of aralkyl radicals are benzyl and phenylethyl radicals.

Examples of polymethylene radicals are penta- and hexamethylene radicals.

Examples of alkyl-substituted polymethylene radicals are methyl pentamethylene, dimethyl pentamethylene, ethyl pentamethylene, propyl pentamethylene, butyl pentamethylene, amyl pentamethylene, methyl ethyl pentamethylene, methyl butyl pentamethylene, trimethyl pentamethylene, and methyl hexamethylene radicals, including isomeric forms thereof, but excluding radicals attached to N by other than primary carbon atoms.

Amine-dithiocarbamate complex compounds similar to those discussed herein have previously been prepared by somewhat cumbersome methods involving a number of steps. Such methods involve the preparation of a metal salt of a substituted dithiocarbamic acid in one or more operations, in accordance with various means known to the art. Then, in a separate and wholly distinct operation, the salt is combined with an amine in order to obtain the complex, and the complex is isolated.

The present invention, which avoids the above lengthy procedure, was conceived primarily as a direct and economical process for preparing such complex compounds by means of a one-step reaction preferably involving substantially stoichiometric amounts of the following reactants: secondary amine, carbon disulfide, and a metal oxide or hydroxide, such as zinc oxide or hydroxide. The reaction is carried out in the presence of a substance, such as an oil, e. g., lubricating oil, which is inert under the conditions of the reaction and which is a solvent for the complex compound or compounds formed in the reaction. Thus in one simple operation the complex products are formed, and simultaneously transferred to and dissolved in a desirable solvent medium.

The one-step reaction of this invention and the products obtained therefrom are indicated by the following equation, which illustrates the preparation of a dibutylamine-zinc dibutyldithiocarbamate complex, using zinc oxide as a source of the metal:

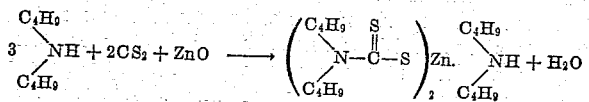

When a hydroxide, instead of an oxide, is employed as the source of the metal, an analogous reaction occurs, except that an additional molecule of water is formed:

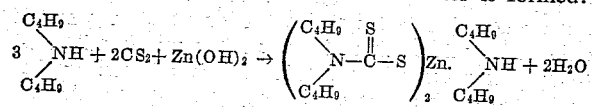

It is only necessary to point out (1) that any metal oxide or hydroxide of this invention may be substituted for the zinc oxide or hydroxide; (2) that any secondary amine of the invention may be substituted for the dibutylamine; and (3) that, if desired, a mixture of secondary amines and/or metal oxides or hydroxides may be employed for reaction purposes, in which case a mixture containing the possible complex compounds in various amounts will be obtained. When certain of these substitutions are made, the above illustrative equations must be corrected accordingly, as will be obvious. For example, when ferric oxide is substituted for zinc oxide, six moles of carbon disulfide and eight moles of secondary amine are required for stoichiometric reaction with each mole of the oxide, the products of the reaction being three moles of water and two moles of a complex having a 1:1 ratio of amine to substituted ferric dithiocarbamate.

As has been pointed out above, it may at times be desired to employ sufficient secondary amine for reaction purposes so that the ratio of amine to metal salt is greater than 1:1. However, products having the 1:1 ratios are preferred, and for complexing purposes in such instances, it is merely necessary to make certain that at least one mole of amine is available per mole of substituted metal dithiocarbamate.

As noted above, the reaction is preferably conducted with approximately stoichiometric quantities of reactants, based on the particular amine-dithiocarbamate complex or mixture of such complexes which is to be produced. However, in view of the fact that carbon disulfide and some of the amines are rather volatile, it may sometimes be desirable to use a very slight excess of these compounds in order to compensate for vapor losses sustained. The reaction time varies with the temperature and particular complex material being formed, but usually ranges from one-half hour to several hours.

After completion of the reaction, the water of reaction may be removed from the resulting oily solution of the complex by any suitable method, such as by centrifuging, or by filtering the solution through highly absorbent paper (e. g., "blotter" paper), or by allowing the solution to stand until an oil phase and a water phase have formed and separating the phases, or by contacting with inert drying agents (e. g., activated alumina, silica gel, calcium chloride, various activated clays, etc.), or by any combination of such procedures.

The following compounds are illustrative of the secondary amines which may be employed in the process: diethylamine, dipropylamine, dibutylamine, diamylamine, dihexylamine, diheptylamine, dioctylamine, dinonylamine, didecylamine, didodecylamine, bis(2-ethylhexyl)amine, bis(2-ethylbutyl)amine, diisobutylamine, diisoamylamine, ethylpropylamine, ethylbutylamine, ethylamylamine, ethyloctylamine, ethyldodecylamine, ethyltetradecylamine, propylamylamine, propyldecylamine, propylpentadecylamine, butylheptylamine, butylnonylamine, amyltridecylamine, dibenzylamine, bis(phenylethyl)amine, ethyl cyclohexylamine, propyl cyclohexylamine, butyl cyclohexylamine, amyl cyclohexylamine, ethyl phenylethylamine, ethyl benzylamine, butyl benzylamine, cyclohexyl benzylamine, hexamethyleneamine, piperidine, propyl-, butyl-, amyl-, and the various mono-, di- and polymethylpiperidines having only primary carbon atoms attached to N.

The invention is particularly useful when reacting those secondary amines which contain a totality of less than 12 carbon atoms, and particularly such amines containing from 4 to 10 carbon atoms, in preparing complexes having at least 20 carbon atoms. Generally speaking, salts of disubstituted dithiocarbamic acids corresponding to amines of this character have excellent oil additive properties (e. g., antioxidant), but they are sparingly soluble in lubricating oils. The amine complexes of such salts, on the other hand, are highly soluble in such oils. The present invention, therefore, provides an uncommonly effective means of solubilizing these products having relatively small hydrocarbon radicals attached to the dithiocarbamate nitrogen atom.

The invention broadly contemplates the presence of primary amines in ordinary commercial secondary amines, particularly primary amines containing alkyl, cycloalkyl, and aralkyl radicals such as those radicals mentioned above. Such presence results in the formation of the corersponding complex compounds, which may lead to undesirable oil solubility properties. It has been observed that such complexes derived from primary amines are initially highly soluble in oils, but when the solutions are allowed to stand for a time, such as several days, decomposition occurs with attendant formation of precipitates and odorous substances. Therefore the use of any considerable amount of primary amines as reactants is not preferred, but this does not preclude the use as reactants of secondary amines containing relatively small amounts of primary amines as contaminants.

Likewise it is preferred that no considerable amounts of tertiary amines be present in the secondary amines which are employed for reaction purposes, inasmuch as tertiary amines appear to form complexes with metal salts of substituted dithiocarbamic acids difficultly, if at all, and therefore merely contaminate the product.

Oleaginous substances or mixtures of such substances generally may be employed for the dual purposes of serving as inert reaction media and as solvents for the complex compounds formed by reaction.

Among such oily materials there may be mentioned mineral oils ranging in viscosity from quite low to quite high, and derived from paraffin base, naphthene base, or mixed base sources. Such oils may be either distillates or residual oils, and if desired they may be oils which have been refined by any means known to the art. Other hydrocarbon oils are the alkaryl hydrocarbons, such as mono-, di-, and polymethyl naphthalenes and higher alkyl naphthalenes, as well as synthetic oils derived from coal or oxides or carbon, or by polymerization of olefins. Other oils are the ester-type oils, such as synthetic ester oils, preferably synthetic liquid ester oils boiling above about 125° C. and naturally occurring oils including oils of vegetable and animal origin. Examples of such synthetic oils are dibutyl phthalate, dioctyl phthalate, amyl acetate, etc. Examples of vegetable and animal oils are castor oil, coconut oil, corn oil, cottonseed oil, oiticica oil, olive oil, tung oil, peanut oil, rapeseed oil, soybean oil, linseed oil, neatsfoot oil, cod oil, lard oil, whale oil, menhaden oil, sardine oil, tallow, and sperm oil. Oily alcohols, such as amyl alcohol, octyl alcohol, nonyl alcohol, octadecyl alcohol, etc., may also be employed.

It will be noted that many of these oily materials are well-known lubricants. As has been pointed out, it is very convenient to prepare a finished lubricant product of superior properties, by diluting a concentrated solution of a complex product of this invention in lubricating oil, with further quantities of the same or other lubricating oil.

Some of the above oily materials, on the other hand, such as the drying and semi-drying oils, are not ordinarily employed as lubricants, but may function for this purpose particularly when stabilized. Solutions of amine-dithiocarbamate complexes in such oils have useful applications, as for example in leather processing, agricultural purposes, etc. Furthermore such dissolved complexes impart good storage characteristics to such oils.

In a preferred practice of the invention, a metal oxide or hydroxide is placed in an ordinary jacketed kettle provided with a simple agitator, and oleaginous material is then added to the kettle. Any convenient amount of oil may be employed, such as sufficient oil to act as an inert reaction medium and to dissolve the amine-dithiocarbamate complex which is to be formed during the reaction. With the agitator in operation, a stoichiometric amount of secondary amine, based on the desired complex, is next added to the kettle. Cooling water is then passed through the jacket of the kettle in order to maintain the reaction mixture within a temperature range of say approximately 0° C. to 40° C., the particular temperature used depending somewhat upon the particular amine and metal oxide or hydroxide employed in the reaction, and the temperature required to melt the oleaginous material if normally solid such as tallow. Ordinarily the reaction is carried out at atmospheric pressure, although subatmospheric pressures or superatmospheric pressures (such as up to 50 pounds per square inch) may be employed if desired.

After the temperature of the mass in the kettle has reached the desired level, a stoichiometric amount of carbon disulfide is added as rapidly as is consistent with holding the temperature at the desired level for causing the reaction to proceed at a reasonable rate, with negligible loss of such volatile reactants as may be present, in case the vessel is open to the atmosphere. After all the carbon disulfide has been added, stirring is continued for a short period, such as up to half an hour, in order to complete the reaction, using a somewhat elevated temperature if necessary to speed up the reaction, say up to 150° C., although it should be noted that depending upon the metal base and amine employed, heating is not required in certain instances, the reaction proceeding at room temperature, e. g., around 20° C. to 25° C.

The crude product is then pumped through a high-speed clarification centrifuge, where the water of reaction is removed as a separate phase and traces of solid impurities are retained in the centrifuge bowl. Ordinarily the centrifugally clarified oil solution of the complex may be considered a finished product. In some cases, however, it may be desirable to filter the centrifuged solution through "blotter" paper in order to obtain a crystal-clear product.

Although the foregoing description teaches the preferred embodiment of the invention, numerous variations may be applied as to type of equipment, procedures, reaction temperatures and pressures, kind of oil employed, order of addition of reactants, etc.

For example, the oil, secondary amine, metal oxide or hydroxide, and carbon disulfide may be charged to the reactor in stoichiometric quantities for the formation of the corresponding metal salt of the substituted dithiocarbamic acid rather than in stoichiometric quantities for the formation of a complex. That is, the further quantity of amine required for complexing purposes is withheld for the time being. The reactants are very intensively mixed in order to form the salt. A stoichiometric amount of secondary amine for conversion of the salt to a complex compound is then added, and the mass is mixed until the complex has been produced and has dissolved in the oil. The oily concentrate of the complex may be freed of water of reaction by any suitable means.

The procedure described in the foregoing paragraph is of particular value when it is desired to obtain an "unsymmetrical" complex compound as the sole product. Such a compound is one in which the amine complex portion and the hydrocarbon substituents of the metal dithiocarbamate portion of the molecule are dissimilar, as for example in the diethylamine complex of zinc dibutyldithiocarbamate which is illustrated above.

The use of a mixture of amines as reactants in the one-step process of the invention probably leads to a mixture of complex compounds, as has been pointed out. For example, when diethylamine, dibutylamine, carbon disulfide, and zinc oxide (or hydroxide) are employed as reactants in the one-step process, the following complex compounds are theoretically obtainable: diethylamine complex of zinc diethyldithiocarbamate, dibutylamine complex of zinc dibutyldithiocarbamate, diethylamine complex of zinc dibutyldithiocarbamate, and dibutylamine complex of zinc diethyldithiocarbamate.

When employing chromium, molybdenum, selenium, or tellurium oxides it is preferred to employ them in their most highly oxidized form, i. e., in their state of highest valence, in view of their better reactivity in these forms.

The following examples are intended to illustrate the invention, without limiting it to the specific reactants and procedures described therein.

EXAMPLE I

Into a 5-liter, 3-neck flask equipped with a simple paddle, motor-driven stirrer, thermometer well, reflux condenser, and dropping funnel connected to a tube extending almost to the bottom of the flask were placed 159 g. of zinc oxide, 473 g. of white oil, 460 g. of dibutylamine and 158 g. of diethylamine. The flask was then placed in an ice-water cooled bath and 290 g. of carbon disulfide was placed in the dropping funnel. The stirrer was started and when the temperature dropped to 7° C., carbon disulfide was slowly added over a period of one-half hour. The maximum temperature during the addition was 26° C. After all the carbon disulfide had been added, the mixture was warmed to room temperature by replacing the ice water with warm water. 20 g. of dicalite filter aid was added to the reaction mass, which was then stirred for several minutes, after which it was filtered through a stainless steel pressure-filter under 2 to 5 pounds per square inch nitrogen pressure. The slightly murky filtrate weighed 1454.8 g. and contained a small amount of water of reaction. Two more such filtrations, each in the presence of 20 g. dicalite, were carried out to produce a light straw-colored, crystal-clear oil, containing approximately 68% by weight of zinc dibutyl- and diethyldithiocarbamate-amine complexes. The yield based on zinc oxide was 93%. The filtrate had a specific gravity of 0.982 at 25° C. and a cloud point of 15° C. A finished lubricant was prepared by blending this filtrate (i. e., concentrate) with sufficient Mid-Continent solvent-extracted base oil to provide a concentration of approximately 0.65% of zinc dialkyldithiocarbamateamine complex. The blending was accomplished quite readily, and the finished lubricant was crystal-clear.

EXAMPLE II 8.1 g. (0.1 mole) of zinc oxide, 37 cc. of raw linseed oil and 38.7 g. (0.3 mole) of dibutylamine were mixed in a 250 cc. Erlenmeyer flask. This mixture was cooled in an ice bath to approximately 10° C. and to the mixture 15.2 g. (0.2 mole) carbon disulfide was slowly added with agitation. After the heat of the reaction was dissipated, the flask was removed from the bath and the reaction mixture was allowed to come to room temperature. The zinc oxide had reacted, as evidenced by the fact that the solution was substantially free of suspended solids, and by the fact that water of reaction was present. The solution was only slightly darker than the original oil.

EXAMPLE III 12.8 g. of cadmium oxide, 36 cc. of dibutyl phthalate, 32.3 g. of dibutylamine, 1.9 g. of diethylamine and 15.2 g. of carbon disulfide were used in the same manner as the materials in Example II. Similar results were obtained in that the cadmium oxide had reacted, as evidenced by the fact that the solution was substantially free of suspended solids and by the fact that water of reaction was present. The water of reaction was removed by absorption on activated alumina followed by filtration which then yielded a crystal-clear liquid.

EXAMPLE IV 21.6 g. of mercuric oxide, 52 cc. of refined olive oil, 38.7 g. of dibutylamine and 15.2 g. of carbon disulfide were used in the same manner as the materials in Example II. A clear solution, free from suspended solids and containing water of reaction was obtained, indicating that the mercuric oxide had reacted.

EXAMPLE V 8.1 g. of zinc oxide, 35 cc. of dioctyl adipate, 38.7 g. of dibutylamine and 15.2 g. carbon disulfide were used in the same manner as the materials in Example II. Similar results were obtained.

EXAMPLE VI 8.1 g. of zinc oxide, 38 cc. of Dow Corning silicone oil DC 550, 38.7 g. of dibutylamine and 15.2 g. of carbon disulfide were used in the same manner as the material in Example II. Similar results were obtained.

EXAMPLE VII 12.8 g. of cadmium oxide, 38 cc. of castor oil, 38.7 g. of dibutylamine and 15.2 g. of carbon disulfide were used in the same manner as the materials in Example II. Similar results were obtained.

EXAMPLE VIII 8.1 g. of zinc oxide, 37 cc. of lard oil, 38.7 g. of dibutylamine and 15.2 g. of carbon disulfide were used in the same manner as the materials in Example II. Similar results were obtained.

EXAMPLE IX 8.1 g. of zinc oxide, 37 cc. of soybean oil, 38.7 g. of dibutylamine and 15.2 g. of carbon disulfide were used in the same manner as the materials in Example II. Similar results were obtained.

EXAMPLE X 8.1 g. of zinc oxide, 37 cc. of cottonseed oil, 38.7 g. of dibutylamine and 15.2 g. of carbon disulfide were used in the same manner as the materials in Example II. Similar results were obtained.

EXAMPLE XI 8.1 g. of zinc oxide, 37 cc. of tung oil, 38.7 g. of dibutylamine and 15.2 g. of carbon disulfide were used in the same manner as the materials in Example II. Similar results were obtained.

EXAMPLE XII

The general procedure of Example I was employed to react 238 g. of zinc oxide, 1134 g. of dibutylamine, and 445 g. of carbon disulfide in the presence of 159 g. of white oil.

The reaction product was filtered once with dicalite in the same pressure-filter; 1921 g. of filtrate containing a small amount of water of reaction was obtained. This filtrate was placed in a separatory funnel and allowed to stand overnight. On the following day, a heavy oil layer which had separated was drawn off, mixed with 20 g. of dicalite and filtered in the pressure-filter. The resulting filtrate was a straw-colored, crystal-clear oil, containing approximately 92% by weight of zinc dibutyldithiocarbamate-dibutylamine complex. A 96.5% yield, based on zinc oxide, was obtained. The specific gravity of the filtrate was 1.057 at 27° C. There was no sharply defined cloud point down to −52° C. A crystal-clear finished lubricant was prepared by blending this concentrate with sufficient Mid-Continent solvent-extracted oil to provide a concentration of approximately 0.64% of the complex.

EXAMPLE XIII

The general procedure of Example I was followed to react 165 g. of zinc oxide, 512 g. of dibutylamine, and 201 g. of dipropylamine, and 301.5 g. of carbon disulfide, in the presence of 663 g. of white oil.

The reaction product was placed in a separatory funnel and allowed to stand overnight, after which the water layer which had formed was drawn off. The remaining oily layer, weighing 1808 g., was mixed with 20 g. of dicalite, and this mixture was filtered through the pressure-filter. There was thus obtained 1730 g. of light straw-colored, crystal-clear oil which contained approximately 63% by weight of zinc dibutyl-and zinc dipropyldithiocarbamate-amine complexes. The yield based on zinc oxide was 96%. The filtrate had a specific gravity of 0.972 at 20° C. and a cloud point of 20° C. A crystal-clear finished lubricant was prepared by blending this concentrate with sufficient Mid-Continent solvent-extracted base oil to provide a concentration of approximately 0.6% of zinc dialkyldithiocarbamate-amine complex.

EXAMPLE XIV 12.8 g. (0.1 mole) of cadmium oxide, 36 cc. of Velsicol AR 50 (methyl naphthalenes), and 38.7 g. (0.3 mole) of dibutylamine were mixed in a 250 cc. Erlenmeyer flask. This mixture was cooled in an ice bath to approximately 10° C., and to the mixture 15.2 g. (0.2 mole) of carbon disulfide was slowly added with agitation. After the heat of reaction was dissipated, the flask was removed from the bath and the reaction mixture was allowed to come to room temperature. The cadmium oxide had reacted, as evidenced by the fact that the solution was substantially free of suspended solids, and by the fact that a small amount of water of reaction was present. The solution had a light straw color which was only slightly darker than the original oil.

A series of similar experiments was carried out in various oleaginous materials using various metal oxides as follows: $Cu_2O$, $CuO$, $Ca(OH)_2$, $Ba(OH)_2$, $HgO$, $CrO_3$, $MoO_3$, $FeO$, $Fe_2O_3$ $Co_2O_3$, $SeO_2$, and $PbO$. In all instances, the resulting solutions were substantially free of suspended solids and water of reaction was noted.

EXAMPLE XV

Into a 1,000-gallon, stainless steel jacketed kettle equipped with a turbine type agitator, thermometer well, vent stack, and a carbon disulfide addition well-pipe is added 315 pounds of finely powdered (0.1 micron average particle diameter) zinc oxide, 1290 pounds of solvent extracted Mid-Continent, SAE 30, base stock lubricting oil, and 1455 pounds of dibutyl-amine. The mixture is agitated and cooling water is passed through the jacket of the kettle. When the temperature reaches 20° C. the addition of carbon disulfide is started and controlled at such a rate that the temperature will remain between 20° C. and 30° C. A total of 571 pounds of carbon disulfide is added over a period of one-half hour. After the addition is complete, the stirring is continued and the reaction mass is warmed to and held at 60° C. for one-quarter hour by substituting steam for the cooling water in the jacket. The temperature is then lowered to 40° C. and the product is pumped from the bottom of the reactor to an oil-clarifying centrifuge, where the small amount of excess zinc oxide sludge is retained in the bowl and the water of reaction is separated from the oil solution of complex through their respective take-off nozzles. The centrifuged oil is transferred to a tank provided with means of agitation, where it is treated with 50 pounds of dicalite filter aid for several minutes before it is pumped through a disc pressure filter to give a crystal-clear oil containing 28% zinc dibutyldithiocarbamate - dibutyl-amine complex. 3380 pounds of oil solution are thus obtained for a 95% conversion based on zinc.

EXAMPLE XVI

To a 3-liter, 3-necked flask equipped with a simple paddle stirrer, thermometer well, dropping funnel with the addition tube extending to the bottom of the flask, and a reflux condenser vent, were added 199.2 grams finely powdered lead oxide (PbO), 971 grams Velsicol AR–40 (methyl naphthalenes) and 327.5 grams dibutylamine. 128.5 grams carbon disulfide was placed in the dropping funnel and slowly added with stirring to the other reactants over a period of fifteen minutes. The temperature during the carbon disulfide addition step increased from 15° C. to 40° C. Heat was then applied to the reaction flask so that the temperature reached a maximum of 90° C. in 30 minutes. The reaction mixture was allowed to cool to room temperature and 15 grams dicalite filter aid added. The slurry was filtered under 2 pounds per square inch nitrogen presssure in a stainless steel filter. The weight of the filtrate and the weight of the precipitate (after washing with acetone and drying) corresponded to a 94.3% conversion based on lead oxide. The filtrate, which still contained a small amount of water of reaction, was treated with 15 grams dicalite and refiltered giving a crystal-clear filtrate having a specific gravity of 1.105 at 25° C. It contained 39% lead dibutyldithiocarbamate-dibutylamine complex.

EXAMPLE XVII

To a three-liter, three-necked flask equipped in the same manner as Example XVI were added 66.1 grams of finely powdered ferric oxide ($Fe_2O_3$), 379.3 grams Velsicol AR–50 (methylnaphthalenes) and 403 grams dibutylamine. 177.8 grams carbon disulfide was slowly added over a period of 23 minutes during which the temperature was controlled between 15° C. and 32° C. At this stage, there was little evidence of reaction with the ferric oxide. The mixture was then heated to between 90° C. and 100° C. over a period of two hours, during which water was evolved and the mixture turned much darker. It was then cooled to room temperature. Fifteen grams dicalite filter aid was added and the slurry filtered under nitrogen pressure to give a crystal-clear, dark red filtrate containing ferric dibutyldithiocarbamate-dibutylamine complex.

EXAMPLE XVIII

In the same equipment as described in Example XVI were added 89.7 grams finely powdered calcium hydroxide, 330 grams Velsicol AR–50 (methylnaphthalenes) and 450 grams dibutyl-amine. 176.8 grams carbon disulfide was then slowly added over a period of 30 minutes at a temperature range between 12° C. and 28° C. After all the carbon disulfide was added, the mixture was heated to about 70° C. On cooling to room temperature, 15 grams of dicalite filter aid were added and the slurry was filtered under nitrogen pressure, giving a crystal-clear oil filtrate containing calcium dibutyldithiocarbamate-dibutylamine complex.

The corrosion- and oxidation-inhibiting properties of the amine-dithiocarbamate complexes of the invention were evaluated by subjecting dilute solutions of complexes in mineral lubricating oil to the laboratory corrosion and oxidation test procedure of Hughes, Bartleson and Sunday, Analytical Chemistry 21, 737–43 (1949). The only variation was that the tests reported herein were conducted for 8 hours instead of 10 hours.

The test solutions, i. e., finished lubricants, were prepared by dissolving in a base oil, such amounts of mineral oil concentrates of the complexes as were required to give the desired concentrations of the complexes in the finished lubricants; these concentrations were such as to provide about 0.15% of sulfur, based on the weight of finished lubricant. The base oil employed throughout was an SAE 20 mineral lubricating oil of Mid-Continent origin.

The particular concentrates used in preparing the finished lubricants (and symbols used to designate these concentrates) were as shown in Table 1.

Table 1

| Symbol | Solvent oil | Alkyl groups in zinc dialkyldithiocarbamate | Complexing amine | Concentration of complex in concentrate, expressed as zinc dialkyldithiocarbamate, percent by wt. |
|---|---|---|---|---|
| A | White oil | Dibutyl | Diethylamine | 50.0 |
| B | do | Dibutyl | Dibutylamine | 47.4 |
| C | SAE 20 Mid-Continent | {Dibutyl / Dipropyl} | do | 14.9 / 5.1 |
| D | White oil | {Dibutyl / Diethyl} | do | 25.0 / 25.0 |
| E | SAE 20 Mid-Continent | Dibutyl | do | 25.0 |
| F | White oil | {Dibutyl / Diethyl} | do | 25.0 / 25.0 |

With respect to concentrate C above, a mixture of solid zinc dibutyldithiocarbamate and zinc dipropyldithiocarbamate was dispersed in the oil, after which the requisite amount of dibutylamine for complexing was added. Similar considerations apply to concentrate D.

Concentrate F was prepared in accordance with Example I. For purposes of calculation, the formation of only two complex compounds was assumed; however, four complex compounds are theoretically possible, as has been pointed out.

The molar ratio of zinc dialkyldithiocarbamate to complexing amine in the above complexes was 1:1.

Evaluation results obtained by applying the test procedure of Hughes et al. (vide supra) to the treated oils and to the same base oil containing no additive, are given in Table 2. The untreated oil is designated as G.

Table 2

| Concentrate | Concentrate, Percent by weight of finished lubricant | Sulfur, Percent by weight of finished lubricant | Corrosion, mg./sq. cm. | Acid number of oil after test |
|---|---|---|---|---|
| A | 1.12 | 0.15 | 2.33 | 0.88 |
| B | 1.19 | 0.15 | 1.66 | 1.07 |
| C | 2.85 | 0.15 | 1.33 | 0.94 |
| D | 0.97 | 0.15 | 0.66 | 0.94 |
| E | 2.24 | 0.15 | 0.50 | 0.79 |
| F | 1.07 | 0.17 | 0.50 | 0.84 |
| G | 0 | 0 | 239.5 | 4.81 |

Thus it is seen that the corrosion-inhibiting characteristics of the amine-dithiocarbamate complexes of the invention are outstanding. It is pointed out that these complexes are likewise effective in inhibiting the formation of acidic substances, as is indicated by the acid numbers of above Table 2.

By way of comparison and using the same test method, the same base oil containing 0.5% by weight of zinc dibutyldithiocarbamate (not complexed with amine) gave a corrosion result of 4.0 mg./sq. cm., and the acid number of the used oil was 1.24.

Also by way of comparison and using the same test method, an SAE 20 premium grade oil containing a detergent and an oxidation and corrosion inhibitor of a different character gave a corrosion result of 3.0 mg./sq. cm.; the acid value of the used oil was not determined.

From the foregoing it can be seen that a highly valuable process for the production of substituted dithiocarbamates in highly oil-soluble form is provided, and that these dithiocarbamates in solution in oil are highly useful for many purposes, depending upon the particular oleaginous matter in which the dithiocarbamates are dissolved, i. e., in the form of their amine complexes. Dissolved in any oleaginous substance and particularly in animal, vegetable and mineral oils, for example in petroleum hydrocarbon oils, these dithiocarbamate complexes impart valuable properties among which are resistance to oxidation and corrosion; dissolved in leather-treating animal oils, these dithiocarbamate complexes impart useful properties, among which is resistance to the growth of leather-attacking microorganisms; dissolved in semi-drying or drying oils, these dithiocarbamate complexes impart good storage characteristics; dissolved in hydrocarbon oil, and particularly in aliphatic, naphthenic or aromatic hydrocarbon oil, the dithiocarbamate complexes are valuable in the compounding of rubber; dissolved in hydrocarbon and other oils, the dithiocarbamate complexes are valuable for agricultural uses, such as fungicides.

When compounding these dithiocarbamate complexes or their oil concentrates with oils generally, for example, hydrocarbon lubricating oils, such as petroleum oils, any desired concentration may be employed, such as from 0.01% to 10% by weight of the final oil composition (or more), and particularly from 0.1% to 5%. In lubricating oils such concentrations impart not only resistance to oxidation but also improved high pressure effects.

Any of the foregoing metal salts of substituted dithiocarbamic acids may be compounded in their amine complex form with any oleaginous material for the purposes set forth herein, of which metal salts the zinc, cadmium, mercury, lead, calcium, barium, and selenium salts are preferred.

Of the various oleaginous reaction media, liquid petroleum hydrocarbon oils (including melted paraffin wax), liquid glycerides of animal or vegetable origin (including liquefied glycerides such as melted tallow), liquid aromatic hydrocarbon oils, and liquid ester and alcohol oils generally and boiling above 125° C., are preferred.

It is to be understood that in compounding the above-mentioned dithiocarbamate complexes with any of the foregoing oils, that any other ingredients may be added for whatever purpose may be desired. Thus the presence of metal salts of substituted dithiocarbamic acids in non-complex form is not precluded, and may be desirable in some instances, and the same applies to other additives for the same or different purposes.

While in the particular description of the process, the secondary amine is added in quantity sufficient to react not only with the carbon disulfide in the formation of the metal salt of the corresponding substituted dithiocarbamic acid but also at least stoichiometrically with the metal salt to form the corresponding amine complex of said salt, lesser amounts may be added with the corresponding expected presence of unreacted and incompletely reacted materials, without departing from the spirit of the invention.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

This application is a continuation-in-part of my co-pending application Serial No. 220,543, filed April 11, 1951, now abandoned.

What I claim is:

1. A process for the production of oil-soluble amine complexes of metal salts of substituted dithiocarbamic acids having at least twenty carbon atoms in the complex molecule which comprises adding to a liquid oleaginous reaction medium which is substantially inert under the conditions of the reaction a secondary amine, carbon disulfide, and one of a group consisting of metal oxides and hydroxides, said secondary amine being added in quantity sufficient to react not only with the carbon disulfide and the inorganic base in the formation of the metal salt of the corresponding substituted dithiocarbamic acid but also with the metal salt to form the corresponding amine complex of said salt, said oxides and hydrovides being from the group consisting of the oxides and hydroxides of copper, silver, calcium, strontium, barium, zinc, cadmium, mercury, lead, hexavalent chromium, hexavalent molybdenum, iron, cobalt, nickel, tetravalent selenium and tetravalent tellurium, and said secondary amine having the formula.

wherein $R_1$ taken individually represents one of the group consisting of alkyl radicals of at least two carbon atoms, cycloalkyl radicals and aralkyl radicals; wherein $R_2$ taken individually represents one of the group consisting of alkyl radicals of at least two carbon atoms and aralkyl radicals; wherein $R_1$ and $R_2$ taken collectively represent one of the group consisting of polymethylene and alkyl-substituted polymethylene radicals; wherein $R_1$ and $R_2$ provide, with the carbon supplied by the carbon disulfide, a complex molecule having at least twenty carbon atoms, and wherein the N-attached carbon atoms of the substituents are attached to not more than one other carbon atom.

2. The process of claim 1 in which the secondary amine is dibutylamine.
3. The process of claim 2 in which the metal is zinc.
4. The process of claim 1 in which the metal is zinc.
5. The process of claim 1 in which the metal is cadmium.
6. The process of claim 1 in which the metal is mercury.
7. The process of claim 1 in which the metal is selenium.
8. The process of claim 1 in which the metal is calcium.
9. An improved oil composition comprising a major portion of oil selected from the group consisting of dibutyl phthalate, dioctyl adipate and mineral lubricating oils and from 0.01% to 10% by weight of said composition of an added amine compound of a metal salt of substituted dithiocarbamic acid, said compound having the formula of the complex which results from adding to a liquid oleaginous reaction medium which is substantially inert under the conditions of the reaction, a secondary amine, carbon disulfide, and one of a group consisting of metal oxides and hydroxides, said secondary amine being added in quantities sufficient to react not only with the carbon disulfide and the organic base, the formation of the metal salt of the corresponding substituted dithiocarbamic acid, but also with the metal salt to form the corresponding amine complex of said salt, said oxides and hydroxides being from the group consisting of the oxides and hydroxides of copper, silver, calcium, strontium, barium, zinc, cadminum, mercury, lead, hexavalent chromium, hexavalent molybdenum, iron, cobalt, nickel, tetravalent selenium, and tetravalent tellurium, and said secondary amine having the formula:

where $R_1$ taken individually represents one of the group consisting of alkyl radicals of at least two carbon atoms, cyclo-alkyl radicals and aralkyl radicals; wherein $R_2$ taken individually represents one of the group consisting of alkyl radicals of at least two carbon atoms and aralkyl carbon atoms: wherein $R_1$ and $R_2$ taken collectively, represent one of the group consisting of polymethylene and alkyl-substituted polymethylene radicals; wherein $R_1$ and $R_2$ provide with the carbon supplied by the carbon disulfide, a complex molecule having at least twenty carbon atoms and wherein the N-attached carbon atoms of the substitutents are attached to not more than one other carbon atom.

10. The lubricant of claim 9 in which the secondary amine is dibutylamine.
11. The lubricant of claim 10 in which the metal is zinc.
12. The lubricant of claim 9 in which the metal is zinc.
13. The lubricant of claim 9 in which the metal is cadmium.
14. The lubricant of claim 9 in which the metal is mercury.
15. The lubricant of claim 9 in which the metal is selenium.
16. The lubricant of claim 9 in which the metal is calcium.
17. A lubricating composition comprising a major amount of a mineral lubricating oil base and blended therewith, in a proportion adequate to impart antioxidant and anti-corrosive properties to the composition, a mineral oil concentrate of at least one compound having the structure of the complex which results from adding to a liquid oleaginous reaction medium which is substantially inert under the conditions of the reaction, a secondary amine, carbon disulfide, and one of a group consisting of metal oxides and hydroxides, said secondary amine being added in quantities sufficient to react not only with the carbon disulfide and the organic base, the formation of the metal salt of the corresponding substituted dithiocarbamic acid, but also with the metal salt to form the corresponding amine complex of said salt, said oxides and hydroxides being from the group consisting of the oxides and hydroxides of copper, silver, calcium, strontium, barium, zinc, cadmium, mercury, lead, hexavalent chromium, hexavalent molybdenum, iron, cobalt, nickel, tetravalent selenium, and tetravalent tellurium, and said secondary amine having the formula:

where $R_1$ taken individually represents one of the group consisting of alkyl radicals of at least two carbon atoms, cycloalkyl radicals and aralkyl radicals; wherein $R_2$ taken individually represents one of the group consisting of alkyl radicals of at least two carbon atoms and aralkyl carbon atoms: wherein $R_1$ and $R_2$ taken collectively, represent one of the group consisting of polymethylene and alkyl-substituted polymethylene radicals; wherein $R_1$ and $R_2$ provide with the carbon supplied by the carbon disulfide, a complex molecule having at least twenty carbon atoms and wherein the N-attached carbon atoms of the substituents are attached to not more than one other carbon atom.

18. An oil concentrate comprising a major proportion of an oil selected from the group consisting of dibutyl phthalate, dioctyladipate and mineral lubricating oils containing between 10% and 95% of at least one compound conforming to the formula of the complex which results from adding to a liquid oleaginous reaction medium which is substantially inert under the conditions of the reaction, a secondary amine, carbon disulfide, and one of a group consisting of metal oxides and hydroxides, said secondary amine being added in quantities sufficient to react not only with the carbon disulfide and the organic base, the formation of the metal salt of the corresponding substituted dithiocarbamic acid, but also with the metal salt to form the corresponding amine complex of said salt, said oxides and hydroxides being from the group consisting of the oxides and hydroxides of copper, silver, calcium, strontium, barium, zinc, cadmium, mercury, lead, hexavalent chromium, hexavalent molybdenum, iron, cobalt, nickel, tetravalent selenium, and tetravalent tellurium, and said secondary amine having the formula:

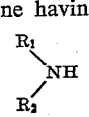

where $R_1$ taken individually represents one of the group consisting of alkyl radicals of at least two carbon atoms, cycloalkyl radicals and aralkyl radicals; wherein $R_2$ taken individually represents one of the group consisting of alkyl radicals of at least two carbon atoms and aralkyl carbon atoms: wherein $R_1$ and $R_2$ taken collectively, represent one of the group consisting of polymethylene and alkyl-substituted polymethylene radicals; wherein $R_1$ and $R_2$ provide with the carbon supplied by the carbon disulfide, a complex molecule having at least twenty carbon atoms and wherein the N-attached carbon atoms of the substitutents are attached to not more than one other carbon atom.

References Cited in the file of this patent
UNITED STATES PATENTS

| | | |
|---|---|---|
| 2,208,327 | Lichty | July 16, 1940 |
| 2,588,428 | Stewart et al. | Mar. 11, 1952 |